(12) United States Patent
Kwok et al.

(10) Patent No.: US 10,051,644 B2
(45) Date of Patent: Aug. 14, 2018

(54) TRANSITIONING A CONVERSATION BETWEEN AN UNLICENSED DATA NETWORK AND A CELLULAR NETWORK

(71) Applicant: T-Mobile USA, Inc., Bellevue, WA (US)

(72) Inventors: Ming Shan Kwok, Seattle, WA (US); Wafik Abdelshahid, Kenmore, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 89 days.

(21) Appl. No.: 14/814,953

(22) Filed: Jul. 31, 2015

(65) Prior Publication Data

US 2017/0034744 A1 Feb. 2, 2017

(51) Int. Cl.
*H04W 72/08* (2009.01)
*H04W 36/00* (2009.01)
*H04W 8/18* (2009.01)
*H04W 8/20* (2009.01)
*H04W 84/12* (2009.01)
*H04W 36/14* (2009.01)

(52) U.S. Cl.
CPC ..... *H04W 72/085* (2013.01); *H04W 36/0038* (2013.01); *H04W 8/18* (2013.01); *H04W 8/20* (2013.01); *H04W 36/14* (2013.01); *H04W 84/12* (2013.01)

(58) Field of Classification Search
CPC combination set(s) only.
See application file for complete search history.

(56) References Cited

U.S. PATENT DOCUMENTS

| 7,065,353 B1 | 6/2006 | Bolinth et al. |
| 2007/0083470 A1* | 4/2007 | Bonner ................. H04W 48/02 705/51 |
| 2008/0119187 A1 | 5/2008 | Gallagher et al. |

(Continued)

FOREIGN PATENT DOCUMENTS

WO WO2014159166 A1 10/2014

OTHER PUBLICATIONS

The PCT Search Report and Written Opinion dated Oct. 14, 2016 for PCT application No. PCT/US2016/042587, 14 pages.

(Continued)

*Primary Examiner* — Yee Lam
(74) *Attorney, Agent, or Firm* — Lee & Hayes, PLLC

(57) ABSTRACT

A conversation is handed over between an unlicensed data network and a cellular network. Voice conversations and/or video conversations may be seamlessly transitioned between cellular networks and unlicensed data networks (e.g., Wi-Fi), with a small transition time (e.g., less than a couple of seconds). The handover may occur from the unlicensed data network to the cellular network or from the cellular network to the unlicensed data network. During the transition between networks, cached registration data is accessed to speed up the authentication of the computing device switching networks. In some configurations, a user may specify preferences for switching between the unlicensed data and cellular networks. For instance, a user may specify a preference to use Wi-Fi networks before cellular networks or to use cellular networks before using Wi-Fi networks.

20 Claims, 4 Drawing Sheets

(56) References Cited

U.S. PATENT DOCUMENTS

| | | |
|---|---|---|
| 2009/0017824 A1 | 1/2009 | Lee et al. |
| 2011/0019639 A1* | 1/2011 | Karaoguz ......... H04W 36/0055 370/331 |
| 2012/0008595 A1* | 1/2012 | Wang .................. H04W 36/385 370/331 |
| 2015/0208309 A1 | 7/2015 | Taneja et al. |

OTHER PUBLICATIONS

Al-Doski et al,. A Cached Registration Scheme for IP Multimedia Subsystem (IMS), Journal of Cyber Security, vol. 3, © 2014 Rivers Publishers, pp. 317-338.

* cited by examiner

TRANSITIONING A CONVERSATION BETWEEN AN UNLICENSED DATA NETWORK AND A CELLULAR NETWORK

BACKGROUND

A computing device, such as a wireless phone, may be capable of terminating (e.g., receiving or originating) phone calls over both unlicensed data networks and a cellular network. For example, when the computing device is connected to a Wi-Fi network, calls may be placed over the Wi-Fi network. When the computing device is not connected to a Wi-Fi network, calls may be placed over a cellular network. Transitioning a call between the different networks, however, can result in poor call quality.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items.

DETAILED DESCRIPTION

Figure 1:
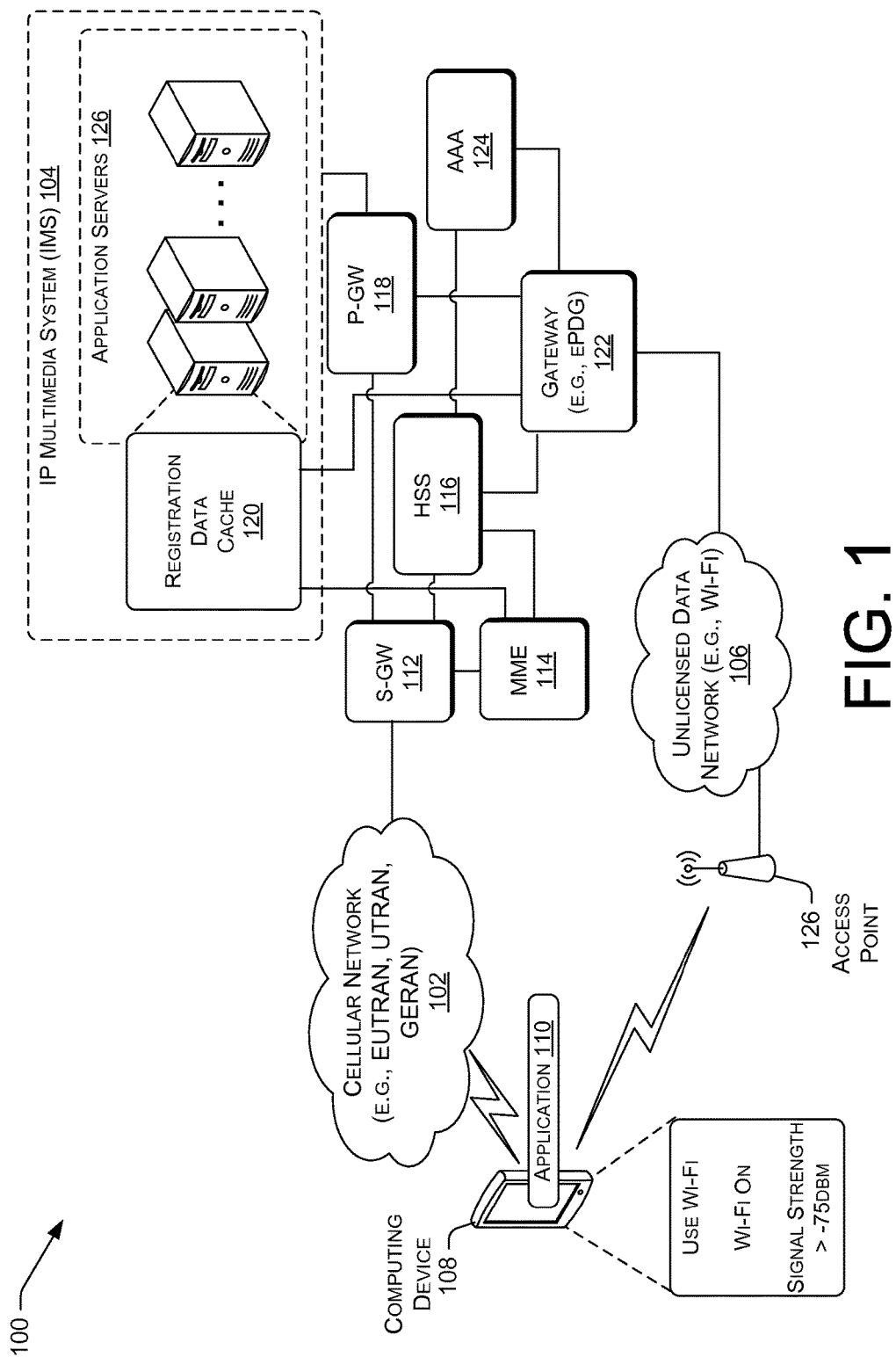
FIG. 1 is a block diagram showing an illustrative environment for transitioning a conversation between an unlicensed data network and a cellular network.

Described herein are techniques and systems for transitioning a conversation between unlicensed data networks and a cellular network. Using techniques described herein, voice and/or video conversations may be seamlessly transitioned between cellular networks and unlicensed data networks (e.g., Wi-Fi), with a small transition time (e.g., less than a couple of seconds).

The handover may occur from an unlicensed data network to the cellular network or from the cellular network to an unlicensed data network. In some configurations, a user may specify preferences for switching between the unlicensed data and cellular networks. For instance, a user may specify a preference to use Wi-Fi networks before cellular networks or to use cellular networks before using Wi-Fi networks. In other cases, the user might specify to use only one type of network (e.g., cellular or data) to utilize.

In some examples, the transition between a cellular network and an unlicensed data network occurs during an existing conversation. For example, a user may begin a conversation on an Evolved Universal Mobile Telecommunications System Terrestrial Radio Access Network (EU-TRAN), or some other type of cellular network, and seamlessly transition to an unlicensed Wi-Fi access network during the conversation. In other examples, the conversation may begin on an unlicensed data network and transition to the cellular network.

According to some configurations, a transition, or connection, to an unlicensed data network is based on the signal strength of the data network. For example, the transition to a Wi-Fi network may be initiated when the received signal strength indicator (RSSI) for the Wi-Fi network is above −75 dBm (or some other value). The RSSI is a measure of the power level that the computing device is receiving from an access point within a data network. Similarly, an existing conversation may be transitioned from an unlicensed data network to the cellular network when the received signal strength indicator (RSSI) for the Wi-Fi network falls below some specified value (e.g., −85 dBm, −75 dBm, or some other value).

In some examples, the user endpoint (UE), such as a mobile phone, initiates when to transition between the different networks. Initially, the computing device requesting the handover to the different network may be authenticated by the wireless service provider associated with the computing device. Authenticating the computing device may assist in preventing unauthorized computing devices from accessing a network or services affiliated with the wireless service provider. To improve the time it takes to transition between networks, cached registration data is accessed to speed up the authentication of the computing device switching networks. For example, registration information previously obtained from the computing device and/or used in a previous registration of the computing device may be obtained from a cache of the cellular network. In this way, the authentication may be performed faster as compared to traditional registration and authentication mechanisms. After being authenticated, the computing device requests to establish a session on the network being transitioned to and disconnect from the current network. For example, if the conversation is using the cellular network, the computing device requests to begin a communication session using the unlicensed data network and to end the communication session on the wireless network. During the time between requesting to disconnect and actual disconnection from the network currently being used, a communication pathway is established within the new network. After the new communication pathway is established, the handover from the current network to the new network is performed. More details are provided below with regard to FIGS. 1-4.

FIG. 1 is a block diagram showing an illustrative environment 100 for transitioning a conversation between an unlicensed data network and a cellular network. The environment 100 may include a cellular network 102 that is operated by a wireless service provider. The cellular network 102 may be a Universal Terrestrial Radio Access Network (UTRAN), an evolved UTRAN network (E-UTRAN) (e.g., Long Term Evolution (LTE), Global System for Mobile communication (GSM) EDGE Radio Access Network (GERAN), or some other type of cellular network 102. Generally, the environment 100 may provide an IP multimedia subsystem (IMS) 104 that supports communication services over a Session Initiation Protocol (SIP) infrastructure. As illustrated, the environment 100 includes an unlicensed data network 106 (e.g., Wi-Fi). The environment 100 is illustrated in simplified form and may include many more components.

As illustrated in FIG. 1, the environment 100 includes a UE, such as computing device 108 utilizing application 110, a serving gateway (S-GW 112), a mobility management entity (MME 114), a home subscriber server (HSS 116), a packet gateway (P-GW 118), an Authentication, Authorization, and Accounting component (AAA 124), a gateway such as ePDG 122, and an access point 126. While not shown, more components may be included within the environment 100. For example, the environment 100 may include an eNodeB, a multimedia resource function control (MRFC), a multimedia resource function processor (MRFP), a proxy CSCF (P-CSCF), an interrogating CSCF (I-CSCF), and the like.

The S-GW 112 may act as the termination point of the packet data interface towards the cellular network 102 (e.g., E-UTRAN). Packets from the cellular network 102 are routed through the S-GW 112. The S-GW 112 acts as a local mobility anchor for the computing device 108.

The MME 114 may provide functionality for subscriber and session management. The MME 114 may be involved in bearer activation and its deactivation procedures and may be responsible for authenticating user towards the HS 116. The MME 114 may also interact with the HSS to determine the current location for the computing device 108 and communicate with the S-GW 112 to request a new communication session.

The HSS 116 stores and updates a database containing user subscription information, including items such as user identification and addressing (e.g., the IMSI (International Mobile Subscriber Identity) and MSISDN (Mobile Subscriber ISDN Number)), user profile information (e.g., subscription data). The HSS 116 may also be configured to perform other operations.

The P-GW 118 acts as an interface the interface between the cellular network 102, and other packet data networks, such as the unlicensed data network 106 or SIP-based IMS 104. The AAA 12 provides functionality to support authentication, authorization and accounting of users and computing devices accessing the cellular network. The ePDG 122 provides an access point to a computing device 108 through the unlicensed data network 106 to services provided by a wireless service provider. The access point 126 allows wireless devices, such as the computing device 108, to connect to the unlicensed data network 106.

The application servers 126 handle and interpret messages, such as SIP messages. In some configurations, one or more of the application servers 106 may be configured to provide support for one more applications, such as application 110. While the application servers 126 are illustrated within the IMS 104, one or more other computing devices may be located outside of the IMS 104. For example, an application server, or some other server or device, may be connected to the IMS 104 via one or more external packet switched networks, such as the Internet.

According to some configurations, a telephony client application, such as application 110, on the computing device 108 may establish data communication with the IMS 104 through a data connection via the P-GW 118. In some examples, the application 110 may be a calling application that requests to place calls (e.g., voice and/or video) using the cellular network 102 and/or the unlicensed data network 106. The application 110 may be configured to determine when to transition from the cellular network 102 to the unlicensed data network 106 and/or when to transition from the unlicensed data network 106 to the cellular network 102. For example, as discussed in more detail below, the computing device 108 may determine when to transition between networks based on user preferences, as well as the availability of the unlicensed data networks and the cellular networks.

According to some configurations, the application 110 on the computing device 108 may connect to the application servers 126, or some other component, via the unlicensed data network 106. In such instances, the application 110 may connect to the network 106 via Wi-Fi access point 126. Accordingly, data traffic from the application 110 may be routed to the application servers 106 by the gateway 122. In other configurations, the application 110 may connect to the application servers 126, or some other component, via the cellular network 102.

In some cases, the computing device 108 is authenticated before connecting to the cellular network 102 and/or before providing services provided by a wireless service provider associated with the cellular network 102. For example, the application servers 106 may authenticate that the computing device 108 is authorized to use service from the IMS 104. According to some configurations, to improve the time it takes to transition between a cellular network and an unlicensed data network, cached registration data is accessed to speed up the authentication of the computing device switching networks. For example, registration information previously obtained from the computing device and/or used in a previous registration of the computing device may be obtained from a cache of the cellular network. The cache might be associated with the application servers 126, the HSS 116, the AAA 124, the MME 114, the gateway 122, or some other device or component associated with the cellular network. As such, instead of having to spend the time required to obtain the registration information from the computing device and other components within the cellular network, registration information obtained or generated during a previous registration of the computing device may be utilized. In some examples, the registration information is cached during a time the computing device is utilizing services associated with the cellular network and some period of time thereafter (e.g., 5 minutes, 10 minutes).

The computing device 108, as well as other user endpoint computing devices may include components and/or functionality for utilizing the gateway 122 (e.g., an ePDG) to establish an IPSec tunnel over the unlicensed data network 106. According to some examples, the gateway 116 is connected to the P-GW 118, which is in turn connected to the cellular network 102. The ePDG may support different IMS services, such as but not limited to voice over LTE (VoLTE), Wi-Fi calling (WFC), video calling (VC), rich communication suite (RCS), and the like.

As briefly discussed, the computing device 108 may request to initiate a communication. According to some examples, the request may be a request to originate a voice call, a video call, or some other type of electronic communication (e.g., SMS, or MMS). In some configurations, the determination of whether to establish the communication over the unlicensed data network 106 or the cellular network 102 is based on availability of the networks, and user preferences. For example, if the unlicensed data network 106 is not available (e.g., the signal strength of a data network is below a specified threshold or there is no data network within range) when the user has specified a preference to use Wi-Fi calling, the communication may be established using the cellular network 102. In other examples, the communication may be initially established over the unlicensed data network 106 when the signal strength of the network is above the specified threshold and the user has enabled placing communications over the data network.

For explanatory purposes, assume that a voice communication is initially established using the cellular network 102. As discussed above, the communication may be placed over any type of cellular network. In some examples, the call is placed over EUTRAN (e.g., LTE). At some point during the voice communication, a determination is made that the communication may be transferred to the unlicensed data network 106. For example, the computing device 108 may detect that the RSSI for the unlicensed data network 106 indicates that the connection to the unlicensed network 106 is acceptable for voice communication. In some examples, the application 110 determines to transition the communication from the cellular network 102 to the unlicensed data network 106 when the RSSI is −75 dBm or better. In other examples, different signal strength thresholds may be utilized.

After determining to transition to a different network (in this case the unlicensed data network 106), the computing device 108 may be authenticated. For example, the AAA 124 and the HSS 116 may be used to authenticate the computing device 108. As discussed above, authenticating the computing device 108 before allowing the computing device 108 to transition to a different network may assist in preventing unauthorized access to services provided by the wireless service provider. As also discussed above, utilizing the cached registration data may improve the speed of the registration and authentication of the computing device 108.

In some configurations, the computing device 108 requests to transition to the unlicensed wireless network 106. According to some examples, the ePDG 122 issues a create session request to the P-GW 118 to request a communication pathway over the unlicensed data network 106. The create session request begins the handover from the cellular network 102 to the unlicensed data network 106.

In response to receiving the create session request, the P-GW 118 sends a "delete bearer request" message to the S-GW 112 which forwards the message to the MME 114 to begin collapsing the communication pathway over the cellular network. After the P-GW 118 receives the delete bearer response, the P-GW 118 may use automatic alternate routing (AAR) to reroute the call from the cellular network 102 to the unlicensed data network 106. Authentication, Authorization and Accounting functions provided by the AAA 122 may be used to authenticate the computing device 108. In some examples, as discussed above, registration data associated with the computing device 108 may be cached within the registration data cache 120 for some period of time. For example, the registration data cache 120 may be cached for as long as the computing device 108 is utilizing services provided by the wireless service provider and some period of time thereafter (e.g., a few minutes). As such, the authentication of the computing device 108 may be faster as compared to requesting the authentication information from components within the environment 100. In some configurations, the registration data is cached within the registration data cache 120 when the computing device 108 first connects to the cellular network 102 and/or otherwise connects to the IMS 104.

After receiving the AAA response from the MME 114, the P-GW 118 sends the create session response to the ePDG 122 and the IPSec tunnel within the unlicensed data network 106 is established and the voice communication is handed over to the unlicensed data network 106. A similar flow is utilized to transition a voice communication from the unlicensed network 106 to the cellular network 102 (See FIG. 4).

Figure 2:
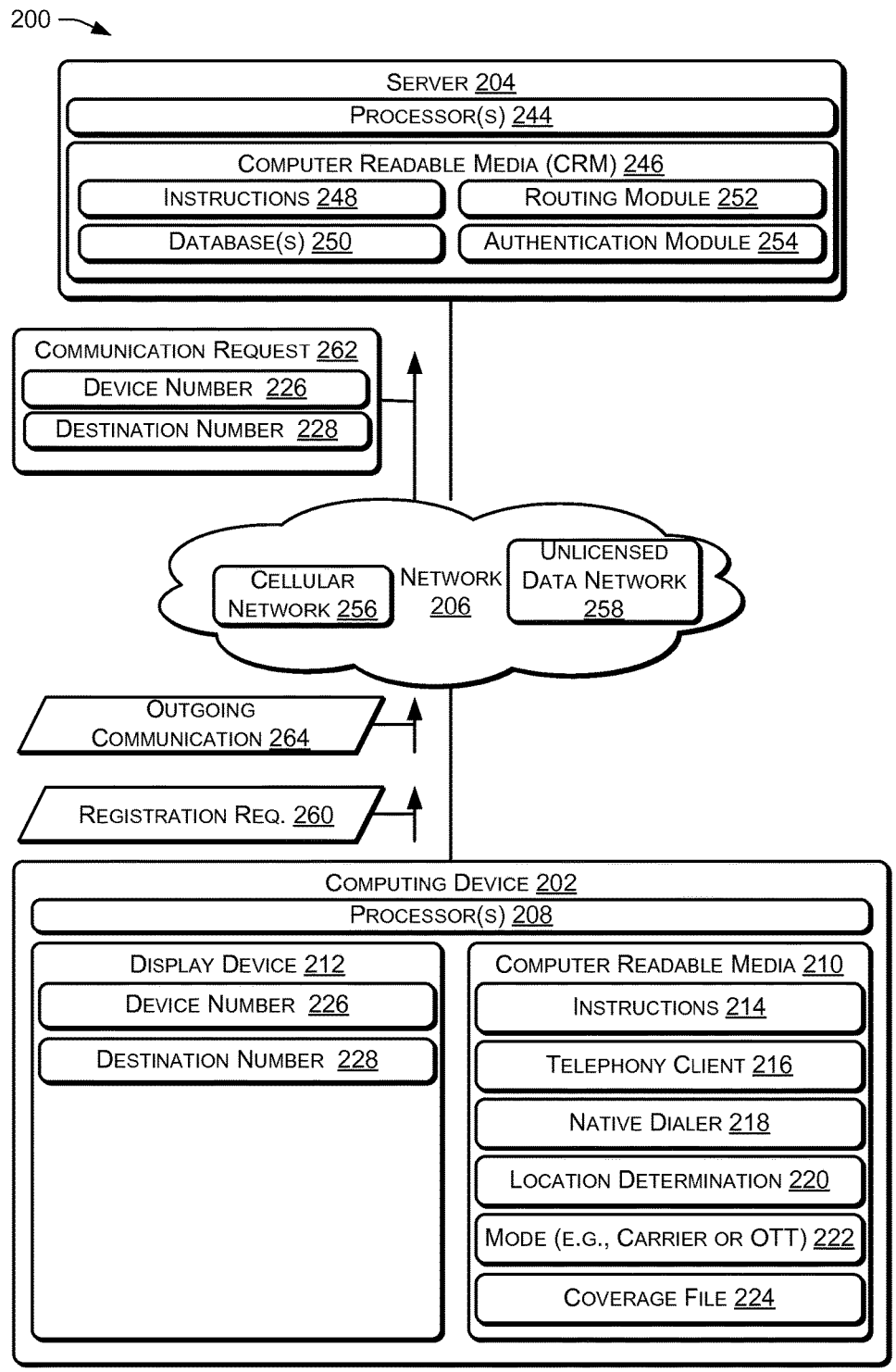
FIG. 2 is a block diagram illustrating a system that includes a telephony client application for transitioning a communication between networks according to some implementations.

FIG. 2 is a block diagram illustrating a system 200 that includes a telephony client application for transitioning a communication between networks according to some implementations. The system 200 includes a computing device 202 coupled to a server 204 via a network 206. The computing device 202 may be configured similarly to the computing device 108. Similarly, the network 256 may be the same network as network 102 and the network 258 may be the same unlicensed data network 106 illustrated in FIG. 1.

The computing device 202 may be a wireless phone, a tablet computer, a laptop computer, a wristwatch, or other type of computing device. The computing device may include one or more processors 208 and computer readable media, such as memory (e.g., random access memory (RAM), solid state drives (SSDs), or the like), disk drives (e.g., platter-based hard drives), another type of computer-readable media, or any combination thereof.

The computer readable media 210 may be used to store instructions to perform various functions and to store data. For example, the computer readable media 210 may include instructions 214, a telephony client 216, a native dialer 218, a location determination module 220, a current mode 222 of operation, and a coverage file 224. Of course, the computer readable media 210 may also include other types of instructions and data, such as an operating system, device drivers, etc. The telephony client 216 may enable a user to place a communication (e.g., a voice call, an SMS, or an MMS) and/or determine when to transition an existing communication from one network to another. For instance, the telephony client 216 may determine that a connection to the unlicensed data network 258 is of sufficient quality to handle a voice call and/or a video call.

The native dialer 218 (also known as a mobile dialer) may be an application that enables calls to be originated via Voice over Internet Protocol (VoIP) using Session Initiation Protocol (SIP) signaling. The location determination module 220 may determine a current location of the computing device 202. For example, the location determination module 220 may determine the current location using the Global Positioning System (GPS). The current location as determined by the location determination module 220 may determine the mode 222. For example, if the current location of the computing device 202 is within a geographic area in which a carrier, associated with a device number 226 of the computing device 202, provides coverage, then the mode 222 may be set to carrier mode. If the current location of the computing device 202 is in a geographic area in which the carrier does not provide coverage (e.g., a location in which a wireless phone associated with the device number 226 would normally roam), then the mode 222 may be set to Over-The-Top (OTT) mode.

The display device 212 may be separate from the computing device 202 or integrated (e.g., as illustrated in FIG. 2) with the computing device 202. The display device 212 may display various information associated with originating a call. In addition to being used as a conventional 10 digit phone number, the device number 226 may also be used as a Uniform Resource Identifier (URI), e.g., as an Internet Protocol (IP) Multimedia Private Identity (IMPI), a unique permanently allocated global identity assigned by a home network operator (e.g., the carrier).

The destination number 228 may be the number of another user to communicate with or call. In other words, the destination number 228 is the location to which the call is routed.

The server 204 may include one or more processors 244 and one or more computer readable media 246. The computer readable media 246 may be used to store instructions 248, one or more databases 250, a routing module 252, and an authentication module 254. The instructions 248 may be executed by the processors 244 to perform the various functions described herein. The databases 250 may include a database storing information, such as which additional numbers are associated with a device number, etc. The routing module 252 may be used to setup, route and transition calls from the computing device 202.

The authentication module 254 may perform various types of authentication, including determining whether the user is authorized to connect to the network 206. The network 206 may include one or more networks, such as a cellular network 256 and an unlicensed data network 258. The cellular network 256 may provide wide-area wireless coverage using a technology such as Global System for Mobile (GSM), Code Division Multiple Access (CDMA), Universal Mobile Telephone Service (UMTS) or the like. While communications between the cellular network 256 and computing devices (e.g., the computing device 202) may be performed using a wide-area wireless network, the cellular network 256 may include other technologies, such as wired (Plain Old Telephone Service (POTS) lines), optical (e.g., Synchronous Optical NETwork (SONET) technologies, and the like.

The unlicensed data network 258 may include various types of networks for transmitting and receiving data (e.g., data packets), including networks using technologies such as Institute of Electrical and Electronics Engineers (IEEE) 802.11 ("WiFi"), IEEE 8021.15.1 ("Bluetooth"), Asynchronous Transfer Mode (ATM), Internet Protocol (IP), and the like. The term "data network" refers to the data packets that are transmitted and received within the unlicensed data network 258. The data packets may be used to carry voice traffic using VoIP or other technologies as well as data traffic.

In some situations, such as after being powered-on or at periodic intervals, the computing device 202 may use the location determination module 220 to determine a current location of the computing device 202 and set the mode 222 to either carrier mode (e.g., when the current location is in a service area of a carrier associated with the device number 226) or OTT mode (e.g., when the current location is outside a service area of a carrier associated with the device number 226).

The telephony client 216 may send a registration request 260 to register the computing device 202 with a local carrier's network. For example, the telephony client 216 may send the registration request 260 to the server 204 to register the computing device 202 with the local carrier associated with the network 206. The registration request 260 may be received by the server 204 that may be configured as a serving call session control function ("S-CSCF") server, or some other component, that is part of an internet protocol multimedia subsystem ("IMS"). The registration request may include a feature tag that specifies different features to register for with one or more application servers. For example, the feature tag may include features, such as, but not limited to a multimedia telephony ("MMTEL") feature, a short message session initiation protocol ("SM-SIP") feature, a rich communication services ("RCS") feature, and the like. The registration request 260 may indicate whether the computing device is registering in cellular mode (e.g., to use the cellular network 256) or OTT mode (e.g., to use the data network 258) as well as specify preferences for using one type of network or another. In cellular mode, the computing device 202 may originate calls and terminate calls using the cellular network. In OTT mode, the computing device 202 may originate calls and terminate calls using the unlicensed data network 258 (e.g., via VoIP).

When a user desires to originate a communication using the computing device 202, the telephony client 216 may prompt the user to select (or enter) the destination number 228 (e.g., the destination of the call). The computing device 202 may send, to the server 204, a communication request 262 that includes the assigned device number 226, an originating device number 230 if different from the assigned device number 226, and the destination number 228. The communication request 262 informs the server 204 that a communication will be placed from the computing device 202.

After receiving the communication request 262, the authentication module 254 may authenticate the communication request 262 and determine whether the account associated with the device number is authorized to originate calls. For example, the authentication module 254 may retrieve account information from the database(s) 250 to determine if the account associated with the computing device 202 is authorized. In some examples, the account information, or other registration data, may be stored within a cache, such as the registration data cache 120 as illustrated in FIG. 1. When the account associated with the device number 226 is not authorized, the server 204 may send a message to the computing device 202 denying the communication request 262. When the account associated with the device number 226 is authorized to originate calls, the server 204 may place the communication to the computing device (s) associated with the destination number 228. The server 204 may also provide communication information, such as described above, to the application server 108 that is assigned to handle requests for the originating device number 230.

Figure 3:
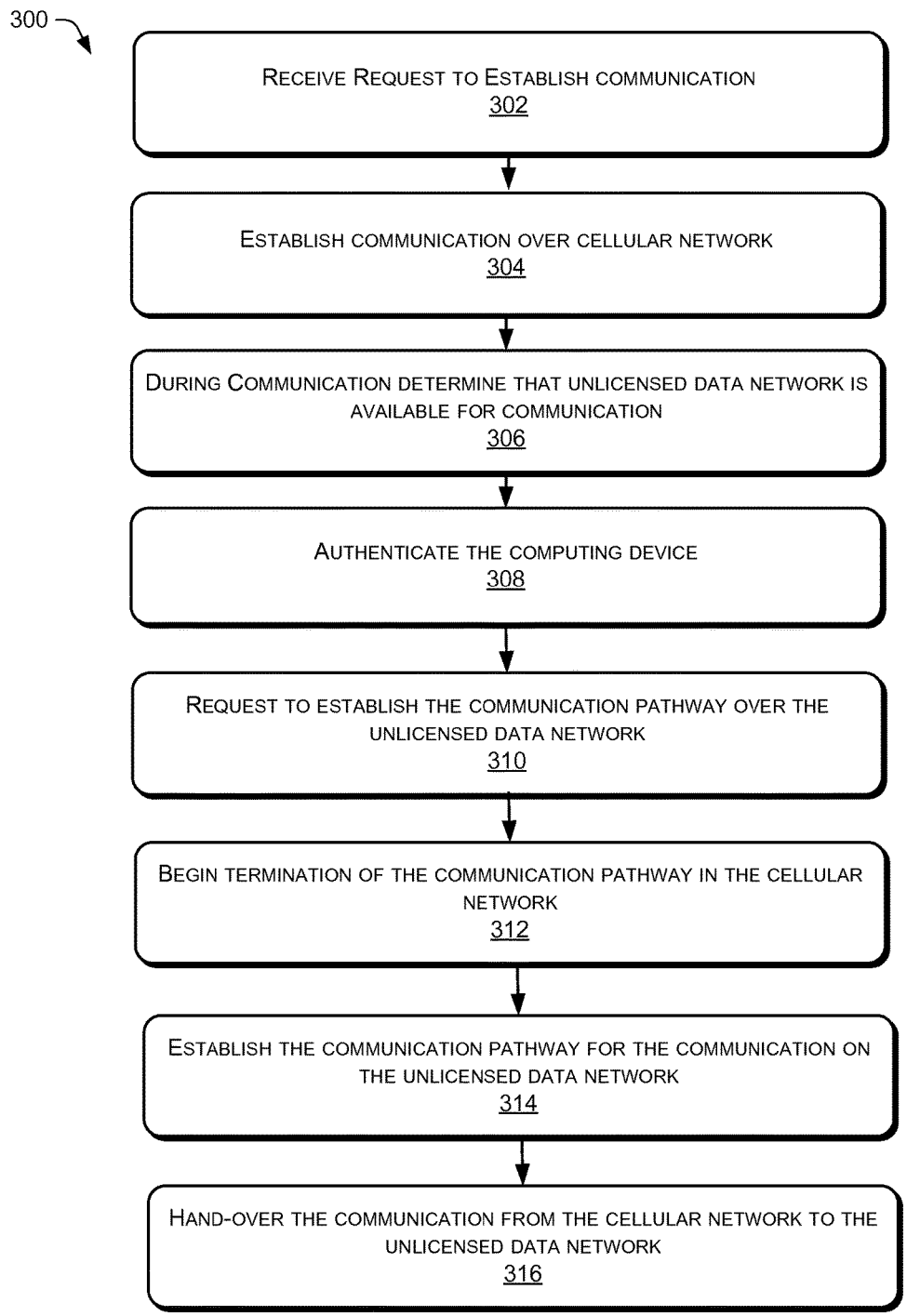
FIG. 3 is a flow diagram of an example process that includes a handover of a communication from an unlicensed data network to a cellular network according to some implementations.
Figure 4:
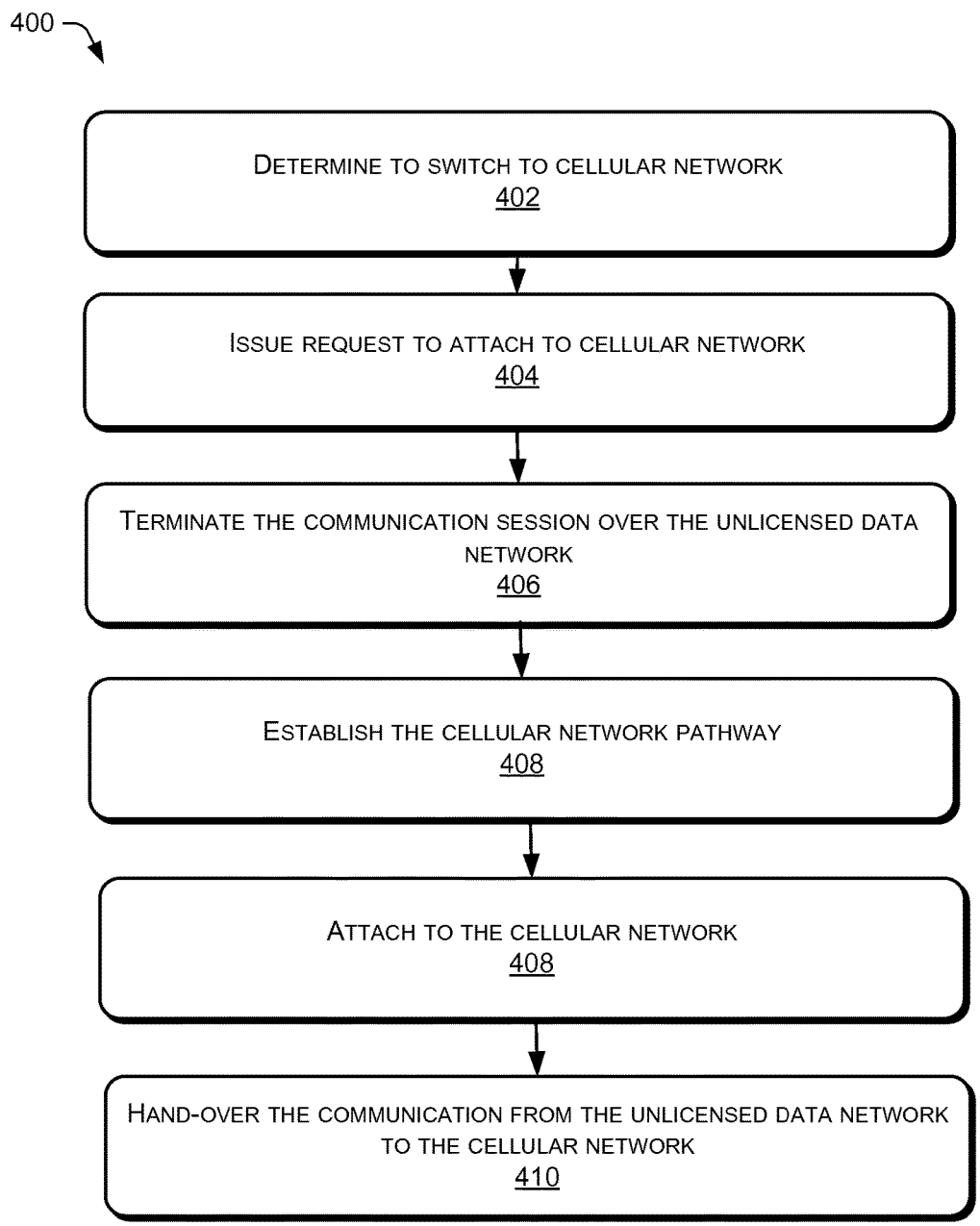
FIG. 4 is a flow diagram of an example process that includes a handover of a communication from the unlicensed data network 106 to the cellular network according to some implementations.

In the flow diagrams of FIGS. 3, and 4 each block represents one or more operations that can be implemented in hardware, software, or a combination thereof. In the context of software, the blocks represent computer-executable instructions that, when executed by one or more processors, cause the processors to perform the recited operations. Generally, computer-executable instructions include routines, programs, objects, modules, components, data structures, and the like that perform particular functions or implement particular abstract data types. The order in which the blocks are described is not intended to be construed as a limitation, and any number of the described operations can be combined in any order and/or in parallel to implement the processes. For discussion purposes, the processes 300, and 400 are described with reference to the systems 100, 200, as described above, although other models, frameworks, systems and environments may implement these processes.

FIG. 3 is a flow diagram of an example process 300 that includes a handover of a communication from an unlicensed data network 106 to a cellular network 102 according to some implementations. The process 300 may be performed by one or more computing devices, such as the computing devices described with regard to FIGS. 1-2.

At 302, a request is received from a computing device to initiate a communication from an originating number to a destination number. As discussed above, the request may be a request to originate a voice call, a video call, or some other type of electronic communication (e.g., SMS, or MMS). As also discussed above, the communication may be placed over the unlicensed data network 106 or the cellular network 102. In some configurations, the determination of whether to establish the communication over the data network 106 or the cellular network 102 is based on availability of the networks, and user preferences. For example, if an unlicensed data network 106 is not available (e.g., the signal strength of a data network is below a specified threshold or there is no data network within range), the communication may be established over the cellular network. In other examples, the communication may be established over the data network when the signal strength of the network is above the specified threshold and the user has enabled placing communications over the data network. For explanatory purposes, FIG. 3 illustrates transitioning from the cellular network 102 to the unlicensed data network 106 and FIG. 4 illustrates transitioning from the unlicensed data network 106 to the cellular network 102.

At 304, the communication is initially established over the cellular network 102. As discussed above, the communication may be placed over many different types of cellular networks. In some examples, the call is placed over an LTE network. For example, a call may be placed over EUTRAN.

At 306, a determination is made during the communication using the cellular network that a data network (e.g., Wi-Fi) is available for communication. As discussed above, the unlicensed data network 106 may be detected by the computing device 108 that initiated the communication. In some examples, a determination is made by the application 110 on the computing device 108 that the signal strength of the unlicensed data network 106 is acceptable for voice communication. For example, the application 110 may compare the signal strength to a threshold value (e.g., −75 dbm or some other value) to determine that the data network will support voice and/or video communications.

At 308, the computing device 108 may be authenticated. As discussed above, the gateway 122 may interact with one or more components of the network 102 to authenticate the computing device 108. For example, an ePDG, such as the gateway 122 may interact with the AAA 124 and/or the HSS 116 to authenticate the computing device 106. In some examples, data that may be used to authenticate the device 108 may be stored within a cache, such as within the registration data cache 120. When the computing device 108 is not authorized, the request to transition to another network may be denied.

At 310, a request to establish a communication pathway over the unlicensed data network 106 is made. As discussed above, the ePDG 122 may issue a create session request message to the P-GW 118. The create session request begins the handover from the cellular network 102 to the unlicensed data network 106 before terminating the communication pathway within the cellular network 102.

At 312, the collapse of the communication pathway is initiated. In response to receiving the create session request, the P-GW 118 may deactivate the communication pathway by sending a delete bearer request message to the S-GW 116. The S-GW 116 may send the delete bearer request to the MME 114.

At 314, the communication pathway over the data network is established. As discussed above, after deleting the bearer, the P-GW 118 may activate the communication pathway (e.g., an IPsec tunnel) within the unlicensed data network 106. In some examples, the P-GW 118 uses automatic alternate routing (AAR) to reroute the call to the unlicensed data network 106.

At 316, the communication is handed over to the data network. As discussed above, the P-GW 118 may send the create session response to the ePDG 122 and the communication transitioned to the unlicensed data network 106.

FIG. 4 is a flow diagram of an example process 400 that includes a handover of a communication from the unlicensed data network 106 to the cellular network 102 according to some implementations. The process 400 may be performed by one or more computing devices, such as the computing devices described with regard to FIGS. 1-2.

At 402, a determination is made during the communication using the unlicensed data network 106 to switch to a cellular network (e.g., EUTRAN). As discussed above, the computing device 108 that initiated the communication may determine that the connection to the unlicensed data network 106 has been lost or that the connection is no longer of acceptable quality for handling voice and/or video communications. In some examples, a determination is made by the computing device 108 that the signal strength is less than −85 dBm, or some other value.

At 404, the computing device 108 may issue a request to attach to the cellular network 102. In some examples, the computing device 108 issues an attach request to the MME 114. The attach request may trigger one or more procedures to establish a dedicated EPS bearer for the computing device 108. For instance, the procedures may include authenticating the computing device 108A, determining a location of the computing device (e.g., using the HSS), and issuing a create session request to the S-GW 112. The S-GW 112 may forward the create session request to the P-GW 118.

At 406, the termination of the communication session using the unlicensed data network 106 may begin. For example, the P-GW 118 may issue a delete bearer request to the ePDG 122 and a session termination request to the AAA 124.

At 408, the communication pathway over the cellular network 102 is established. As discussed above, after deleting the bearer, the P-GW 118 may activate the communication pathway within the cellular network 102. In some examples, the P-GW 118 transmits a create session response to the S-GW 112 that is provided to the MME 114.

At 410, in response to receiving the create session response, the MME 114 communicates with the computing device 108 (e.g., via an EnodeB) to reconfigure the communication and attach the communication to the cellular network 102. In some examples, the MME 114 transmits a modify bearer request to the S-GW 112 to complete the handover. At 412, the communication is handed over to the cellular network 102 where the communication may continue.

The various techniques described above are assumed in the given examples to be implemented in the general context of computer-executable instructions or software, such as program modules, that are stored in computer-readable storage and executed by the processor(s) of one or more computers or other devices such as those illustrated in the figures. Generally, program modules include routines, programs, objects, components, data structures, etc., and define operating logic for performing particular tasks or implement particular abstract data types.

Other architectures may be used to implement the described functionality, and are intended to be within the scope of this disclosure. Furthermore, although specific distributions of responsibilities are defined above for purposes of discussion, the various functions and responsibilities might be distributed and divided in different ways, depending on particular circumstances.

Similarly, software may be stored and distributed in various ways and using different means, and the particular software storage and execution configurations described above may be varied in many different ways. Thus, software implementing the techniques described above may be distributed on various types of computer-readable media, not limited to the forms of memory that are specifically described.

Furthermore, although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed Is:

1. A computer-implemented method performed by one or more processors configured with specific instructions, the computer-implemented method comprising:
   registering a computing device on a cellular network;
   storing, in a cache memory, cached registration data that was generated in association with registering the computing device on the cellular network, wherein the cached registration data includes user preferences;
   establishing a communication session for the computing device on the cellular network, wherein the communication session includes voice data;
   accessing the user preferences specifying a priority order associated with switching between the cellular network and an unlicensed data network, wherein the priority order comprises at least one of (a) using the unlicensed data network before the cellular network, and (b) using the cellular network before the unlicensed data network;
   determining to connect the computing device to the unlicensed data network based on the priority order;
   accessing, from the cache memory, the cached registration data;
   authenticating the computing device utilizing the cached registration data;
   initiating a connection to the unlicensed data network;
   in response to initiating the connection to the unlicensed data network, terminating the communication session on the cellular network; and
   handing over the communication session to the unlicensed data network.

2. The computer-implemented method of claim 1, wherein determining to connect the computing device to the unlicensed data network comprises determining that a signal strength of a Wi-Fi network exceeds a threshold value.

3. The computer-implemented method of claim 1, wherein the cellular network is a long term evolution (LTE) cellular network, the unlicensed data network is a Wi-Fi network, and the computing device is a mobile phone.

4. The computer-implemented method of claim 1, further comprising authenticating the computing device before initiating the connection to the unlicensed data network.

5. The computer-implemented method of claim 4, wherein handing over the communication session to the unlicensed data network takes less than two seconds.

6. The computer-implemented method of claim 1, wherein determining to connect the computing device to the unlicensed data network comprises accessing user preferences to determine a first condition associated with a time to connect the computing device to the unlicensed data network.

7. The computer-implemented method of claim 1, wherein storing, in a cache memory, the cached registration data further comprises storing the cached registration data within a cache of the cellular network, wherein the cached registration data remains stored within the cache while the computing device is utilizing services associated with the cellular network and for a period of time thereafter.

8. A system comprising:
   one or more processors; and
   one or more memories storing instructions that, when executed by the one or more processors, perform acts including:
   receiving, from a client computing device, a registration request to connect to a cellular network, the registration request including user preferences;
   storing, in a cache memory, cached registration data that was obtained in association with the registration request to connect to the cellular network;
   establishing a communication session for the client computing device using a first network, the first network including the cellular network or an unlicensed data network;
   accessing the user preferences specifying a priority order associated with switching between the cellular network and the unlicensed data network, wherein the priority order comprises at least one of (a) using the unlicensed data network before the cellular network, and (b) using the cellular network before the unlicensed data network;
   receiving, from the client computing device, a request to initiate, based on the priority order, a handover of the communication session from the first network to a second network, wherein the second network is the unlicensed data network when the first network is the cellular network and the second network is the cellular network when the first network is the unlicensed data network;
   accessing, from the cache memory, the cached registration data;
   authenticating the client computing device utilizing the cached registration data;
   initiating a connection to the second network;
   terminating the communication session on the first network; and
   handing over the communication session from the first network to the second network.

9. The system of claim 8, wherein the request to initiate the handover of the communication session from the first network to the second network is based, at least in part, on a signal strength of the unlicensed data network.

10. The system of claim 8, wherein the cellular network is a long term evolution (LTE) cellular network and the unlicensed data network is a Wi-Fi network.

11. The system of claim 8, wherein the acts further comprise accessing the cached registration data from a cache of the cellular network before initiating the connection to the second network.

12. The system of claim 8, wherein the cached registration data is stored within a cache associated with the cellular network during a time the client computing device is connected to the first network and the second network.

13. The system of claim 8, wherein the client computing device determines to initiate the handover of the communication session from the first network to the second network.

14. The system of claim 8, wherein receiving, from the client computing device, the request to initiate the handover further comprises accessing user preferences to determine a first condition associated with a time to connect the client computing device to the unlicensed data network.

15. A non-transitory computer-readable media storing computer-executable instructions that, when executed, cause one or more processors of a computing device to perform acts comprising:
   receiving a registration request to register a client computing device with a cellular network, the registration request including user preferences;

storing, in a cache memory, cached data that was generated in association with the registration request;

establishing a communication session for a client computing device using a first network, the first network including a cellular network or an unlicensed data network;

accessing the user preferences specifying a priority order associated with switching between the cellular network and the unlicensed data network, wherein the priority order comprises at least one of (a) using the unlicensed data network before the cellular network, and (b) using the cellular network before the unlicensed data network;

initiating, based on the priority order, a connection to a second network, wherein the second network is the unlicensed data network when the first network is the cellular network and the second network is the cellular network when the first network is the unlicensed data network;

accessing, from the cache memory, the cached data;

authenticating the client computing device utilizing the cached data;

terminating the communication session on the first network; and handing over the communication session from the first network to the second network.

16. The non-transitory computer-readable media of claim 15, wherein the acts further comprise receiving, from the client computing device, a request to initiate a handover of the communication session from the first network to the second network.

17. The non-transitory computer-readable media of claim 16, wherein the request to initiate the handover is based, at least in part, on a signal strength of the unlicensed data network.

18. The non-transitory computer-readable media of claim 15, wherein the cellular network is a long term evolution (LTE) cellular network and the unlicensed data network is a Wi-Fi network.

19. The non-transitory computer-readable media of claim 15, wherein the acts further comprise accessing the cached data from a cache of the cellular network before initiating the connection to the second network.

20. The non-transitory computer-readable media of claim 15, wherein initiating, based on the priority order, the connection to the second network further comprises accessing user preferences to determine a first condition associated with a time to connect the computing device to the unlicensed data network.

* * * * *